US009654853B2

(12) United States Patent
Mehrvar (10) Patent No.: US 9,654,853 B2
(45) Date of Patent: May 16, 2017

(54) SYSTEM AND METHOD FOR PHOTONIC SWITCHING (71) Applicant: Huawei Technologies Co., Ltd., Shenzhen (CN)

(72) Inventor: Hamid Mehrvar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 383 days.

(21) Appl. No.: 14/246,633

(22) Filed: Apr. 7, 2014

(65) Prior Publication Data
US 2014/0334818 A1  Nov. 13, 2014

Related U.S. Application Data (60) Provisional application No. 61/822,128, filed on May 10, 2013.

(51) Int. Cl.
*H04Q 11/00* (2006.01)
*H04J 14/02* (2006.01)

(52) U.S. Cl.
CPC ...... *H04Q 11/0066* (2013.01); *H04J 14/0258* (2013.01); *H04Q 11/0005* (2013.01); *H04Q 2011/0024* (2013.01); *H04Q 2011/0039* (2013.01); *H04Q 2011/0064* (2013.01)

(58) Field of Classification Search
CPC .................. H04Q 11/0005–11/00079
See application file for complete search history.

(56) References Cited

U.S. PATENT DOCUMENTS

| 5,541,756 A | 7/1996 | Chang-Hasnain et al. |
| 6,920,135 B1* | 7/2005 | Lea ..................... H04L 49/1507 370/389 |
| 7,031,607 B1 | 4/2006 | Aswood Smith |
| 7,120,157 B2 | 10/2006 | Xue et al. |
| 2002/0018263 A1* | 2/2002 | Ge ........................ H04L 49/106 398/87 |

(Continued)

FOREIGN PATENT DOCUMENTS

| CN | 1604504 A | 4/2005 |
| CN | 101437178 A | 5/2009 |

(Continued)

OTHER PUBLICATIONS

Beheshti, N., et al., "Optical Packet Buffers for Backbone Internet Routers," IEEE/ACM Transactions on Networking, vol. 18, No. 5, Oct. 2010, 11 pages.

(Continued)

*Primary Examiner* — Shi K Li
*Assistant Examiner* — Mina Shalaby
(74) *Attorney, Agent, or Firm* — Slater Matsil, LLP (57) ABSTRACT In one embodiment, a photonic switching fabric includes a first label detector configured to read a first optical label to produce a first detected label, where the first optical label corresponds to a first optical packet, and where the first optical label is in a control waveband and a switch controller configured to adjust a photonic switch in accordance with the first detected label. The photonic switching fabric also includes the photonic switch, configured to switch the first optical packet, where the first optical packet is in a payload waveband.

20 Claims, 12 Drawing Sheets

(56) References Cited

U.S. PATENT DOCUMENTS

| | | | |
|---|---|---|---|
| 2002/0027686 A1* | 3/2002 | Wada | H04Q 11/0005 398/87 |
| 2003/0133641 A1* | 7/2003 | Yoo | B82Y 20/00 385/14 |
| 2004/0033074 A1 | 2/2004 | Hsu | |
| 2004/0037558 A1* | 2/2004 | Beshai | H04Q 11/0005 398/57 |
| 2004/0208544 A1 | 10/2004 | Ovadia | |
| 2005/0069329 A1 | 3/2005 | Giles et al. | |
| 2012/0275783 A1* | 11/2012 | Kitajima | H04J 14/0267 398/27 |
| 2013/0195448 A1 | 8/2013 | Ashwood-Smith et al. | |
| 2014/0056371 A1* | 2/2014 | Ji | H04L 27/2697 375/260 |
| 2014/0161450 A1 | 6/2014 | Graves et al. | |
| 2014/0161451 A1 | 6/2014 | Graves et al. | |
| 2014/0269351 A1 | 9/2014 | Graves et al. | |
| 2014/0334821 A1 | 11/2014 | Mehrvar | |

FOREIGN PATENT DOCUMENTS

| | | |
|---|---|---|
| EP | 1187508 A2 | 3/2002 |
| JP | H10500268 A | 1/1998 |
| JP | 2002084228 A | 3/2002 |
| WO | 9533324 A2 | 12/1995 |
| WO | 2007056713 A2 | 5/2007 |
| WO | 2008131802 A1 | 11/2008 |

OTHER PUBLICATIONS

Burmeister, E.F., et al., "A Comparison of Optical Buffering Technologies," Optical Switching and Networking, Electrical and Computer Engineering Department, University of California, accepted Jul. 4, 2007, 9 pgs.

PCT International Search Report and Written Opinion, International Application No. PCT/CN2014/076802, Applicant: Huawei Technologies, Co., Ltd., date of mailing Aug. 12, 2014, 11 pages.

Pattavina, A., "Architectures and Performance of Optical Packet Switching Nodes for IP Networks," Journal of Lightwave Technology, vol. 23, No. 3, Mar. 2005 pp. 1023-1032.

Suzaki et al., "Hybrid Optoelectronic Router for Optical Packet Switching," 8D4-2 (Invited), 15th OptoElectronics and Communications Conference (OECC2010) Technical Digest, Jul. 2010, 2 pgs.

Asghari, M. et al., "Kotura Analysis: WDM PICs improve cost over LR4," IEEE P802.3bm-40 Gb/s & 100 Gb/s Fiber Optic Task Force, Sep. 2012, 11 pgs.

Barker, K. et al., "On Feasibility of Optical Circuit Switching for High Performance Computing Systems," Proceedings of the ACM/IEEE SC 2005 Conference Supercomputing, Nov. 2005, 22 pgs.

Battestilli, T. et al., "An introduction to optical burst switching," Communications Magazine, IEEE , vol. 41, No. 8, Aug. 2003, 6 pgs.

Blumenthal, D.J. et al., "Integrated Photonics for Low-Power Packet Networking," IEEE Journal of Selected Topics in Quantum Electronics, vol. 17, No. 2, Mar.-Apr. 2011, pp. 458-471.

Chen, Y. et al., "Optical Burst Switching (OBS): A New Area in Optical Networking Research," IEEE Network Magazine, vol. 18, No. 3, May-Jun. 2004, 13 pgs.

Farrington, N. et al., "Helios: A Hybrid Electrical/Optical Switch Architecture for Modular Data Centers," SIGCOMM'10, Aug. 30-Sep. 3, 2010, 12 pgs.

Gripp, J. et al., "Photonic terabit routers: The IRIS project," 2010 Conference on (OFC/NFOEC) Optical Fiber Communication (OFC), collocated National Fiber Optic Engineers Conference, Mar. 2010, 3 pgs.

Grzybowski, R. R. et al., "The Osmosis Optical Packet Switch for Supercomputers: Enabling Technologies and Measured Performance," 2007 Photonics in Switching, Aug. 2007, 2 pgs.

Kachris, C. et al., "A Survey on Optical Interconnects for Data Centers," IEEE Communications Surveys & Tutorials, vol. 14, No. 4, Fourth Quarter Oct.-Dec. 2012, 16 pgs.

Kodi, A. K., "Energy-Efficient and Bandwidth-Reconfigurable Photonic Networks for High-Performance Computing (HPC) Systems," IEEE Journal of Selected Topics in Quantum Electronics, vol. 17, No. 2, Mar.-Apr. 2011, pp. 384-395.

Lai, C. P. et al., "Demonstration of Asynchronous Operation of a Multiwavelength Optical Packet-Switched Fabric," IEEE Photonics Technology Letters, vol. 22, No. 16, Aug. 15, 2010, pp. 1223-1225.

Ma, H. et al., "Hybrid Photonic Ethernet Switch for Datacenters," Communication Technology Lab, Huawei Technologies Co., Ltd. Mar. 2014, 3 pgs.

Mason, L. et al., "Topological Design and Dimensioning of Agile all Photonic Networks," Computer Networks: The International Journal of Computer and Telecommunications Networking—Optical Networks, vol. 50, Issue 2, Feb. 2006, 29 pgs.

Morsy-Osman, M.H. et al., "Performance Evaluation of an Optical Burst Switched Core Node with Generalized Arrivals and Partial Wavelength Conversion Capability," IEEE/OSA Journal of Optical Communications and Networking, vol. 4, No. 12, Dec. 2012, pp. 997-1007.

Sato, K. et al., "A Large-Scale Wavelength Routing Optical Switch for Data Center Networks," IEEE Communications Magazine, vol. 51, No. 9, Sep. 2013, pp. 46-52.

Singla, A. et al., "Proteus: A Topology Malleable Data Center Network," Hotnets-IX Proceedings of the 9th ACM SIGCOMM Workshop on Hot Topics in Networks, Article No. 8, Oct. 2010, 6 pgs.

Wada, N. et al., "Field Demonstration of 1.28T bit/s/port, Ultra-wide Bandwidth Colored Optical Packet Switching with Polarization Independent High-speed Switch and All-optical Hierarchical Label Processing," ECOC 2007—33rd European Conference and Exhibition of Optical Communication, Sep. 2007, 2 pgs.

Wang, G. et al., "c-Through: Part-time Optics in Data Centers," SIGCOMM'10, Aug. 30-Sep. 3, 2010, pp. 327-338.

Xi, Kang et al., "Petabit Optical Switch for Data Center Networks," Polytechnic Institute of New York University, Sep. 2010, 9 pgs.

Ye, X. et al., "DOS—A Scalable Optical Switch for Datacenters," ANCS'10, Oct. 2010, 12 pgs.

Chao, J.H. et al., "Bufferless Optical Clos Switches for Data Centers," 2011 Optical Fiber Communication Conference and Exposition and the National Fiber Optic Engineers Conference, Mar. 6-10, 2011, pp. 1-3, Los Angeles, CA.

* cited by examiner

SYSTEM AND METHOD FOR PHOTONIC SWITCHING

This application claims the benefit of U.S. Provisional Application Ser. No. 61/822,128 filed on May 10, 2013, and entitled "System and Method for Out-of-band Signaling for Buffer-less Datacenter Photonic Switches and High Capacity Optical Packet Rings," which application is hereby incorporated herein by reference.

TECHNICAL FIELD

The present invention relates to a system and method for optical communications, and, in particular, to a system and method for photonic switching.

BACKGROUND

Growth of internet traffic, fueled by the growth in the number of users and by increasing numbers of applications results in a higher demand for bandwidth. This growth entails larger packet networks with greater switching capabilities. Data centers contain huge numbers of racks of servers, racks of storage devices, and other racks, all of which are interconnected via a massive centralized packet switching resource. In data centers, electrical packet switches are used to route data packets. Electronic packet switching at very high rates involves massive cooling and space costs. Thus, photonic packet switching is desirable.

The racks of servers, storage, and input-output functions contain top of rack (TOR) switches which combine packet streams from their associated servers and/or other peripherals into a smaller number of high speed streams per TOR switch which are routed to the packet switching core. Also, TOR switches receive the returning switched streams from that resource and distribute them to servers within their rack. There may be 4×40 Gb/s streams from each TOR switch to the packet switching core, and the same number of return streams. There may be one TOR switch per rack, with hundreds to tens of thousands of racks, and hence hundreds to tens of thousands of TOR switches in a data center.

SUMMARY

An embodiment photonic switching fabric includes a first label detector configured to read a first optical label to produce a first detected label, where the first optical label corresponds to a first optical packet, and where the first optical label is in a control waveband and a switch controller configured to adjust a photonic switch in accordance with the first detected label. The photonic switching fabric also includes the photonic switch, configured to switch the first optical packet, where the first optical packet is in a payload waveband.

An embodiment method of photonic packet switching includes receiving, by a photonic switching fabric from a first top-of-rack (TOR) switch, a first optical label corresponding to a first optical packet, where the first optical label is in a control waveband and determining whether the first TOR switch has permission to transmit the first optical packet to produce a first contention signal. The method also includes transmitting, by the photonic switching fabric to the first TOR switch, the first contention signal, where the first contention signal is in the control waveband and receiving, by the photonic switching fabric from the first TOR switch, the first optical packet when the first TOR switch has permission to transmit the first optical packet, where the first optical packet is in a payload waveband.

An embodiment method of coordinating photonic packets includes transmitting, by a top-of-rack (TOR) switch to a photonic switching fabric, a control signal including an address of an optical packet, where the control signal is in a control waveband and receiving, by the TOR switch from the photonic switching fabric, a grant indicator. The method also includes determining a transmission approval in accordance with the grant indicator and transmitting, by the TOR switch to the photonic switching fabric, the optical packet in accordance with the transmission approval, where the optical packet is in a payload waveband.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment all-optical photonic packet switch does not use optical fiber delay lines. Optical fiber delay lines are expensive, bulky, and finite size. The embodiment photonic packet switch also includes an optical space switch, not an optical waveguide grating (AWG-R). An example uses synchronous contention control. In a space switch, one port is connected to another port for the duration of the packet. A separate wavelength band is used for signaling and payload. Some wavebands that may be used are the 800 nm waveband, the 1310 nm waveband, and/or the 1550 nm waveband. In one example, the 800 nm waveband is from 750 nm to 850 nm, the 1310 nm waveband is from 1260 nm to 1360 nm, and the 1550 nm waveband is from 1510 nm to 1610 nm. The signaling waveband is used for routing requests, synchronizations, grants, and other control signals used in the operation of a photonic switch. A header is sent in advance, so a response can be received before the packet is sent. Thus, buffering occurs in the electrical domain, not the optical domain.

Figure 1:
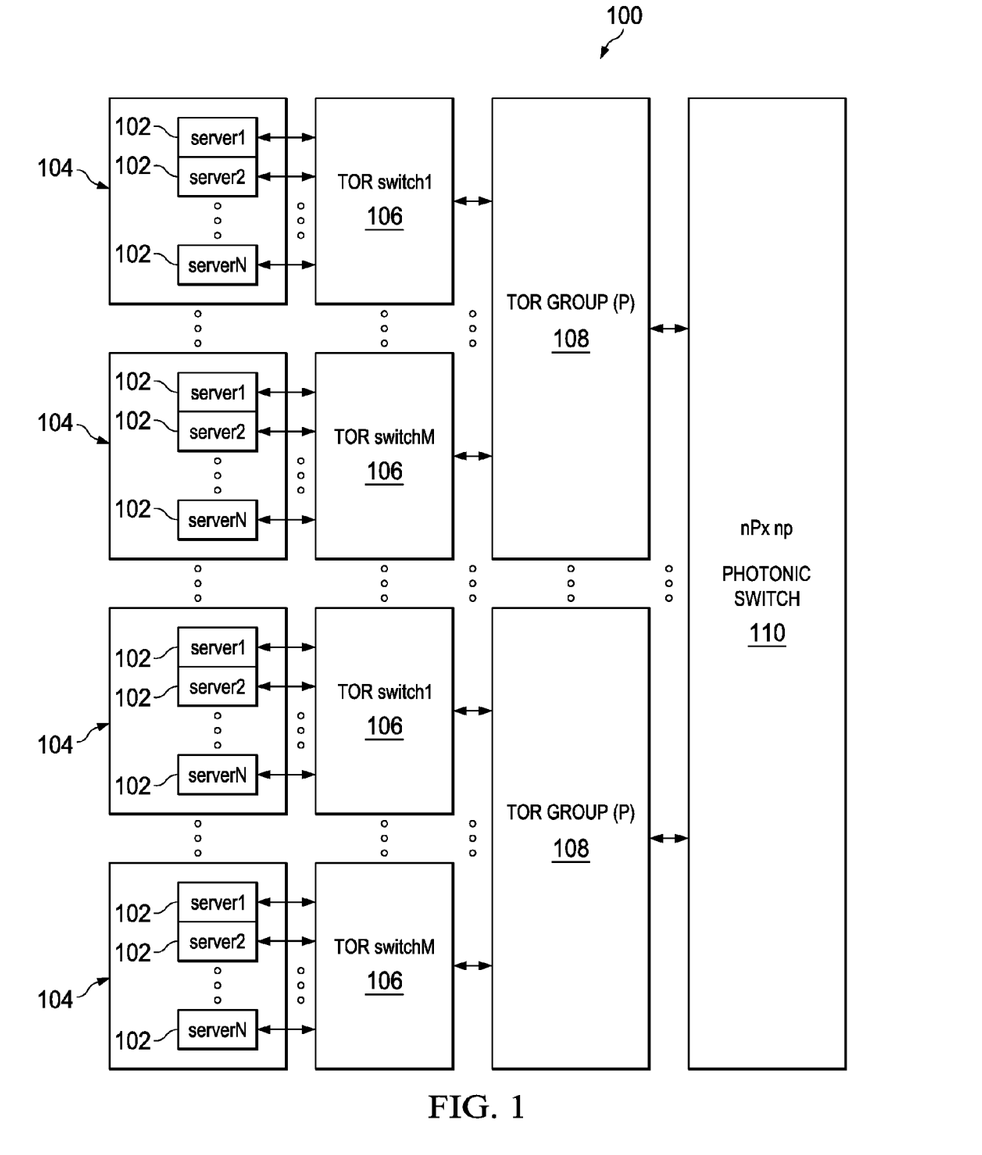
FIG. 1 illustrates an embodiment data center.

FIG. 1 illustrates data center 100, a single hub three tier data center. Server banks 104 contain N servers 102 each. Servers of the server banks are connected to top of rack (TOR) switches 106, the smallest switches. Servers 102 and TOR switches 106 are organized in racks. TOR groups 108, cluster switches, are connected to TOR switches 106. There are M TOR switches per TOR group, and P TOR groups. TOR groups 108 are connected to photonic switch 110, an nP by nP photonic switch, with n parallel interfaces. In one example, N=48, M=32, P=32, and n=1, which has 50,000 servers. Traffic is routed from source servers of servers 102 through TOR switches 106, TOR groups 108 to be switched by photonic switch 110. The traffic then proceeds through TOR groups 108 and TOR switches 106 to destination servers of servers 102.

Figure 2:
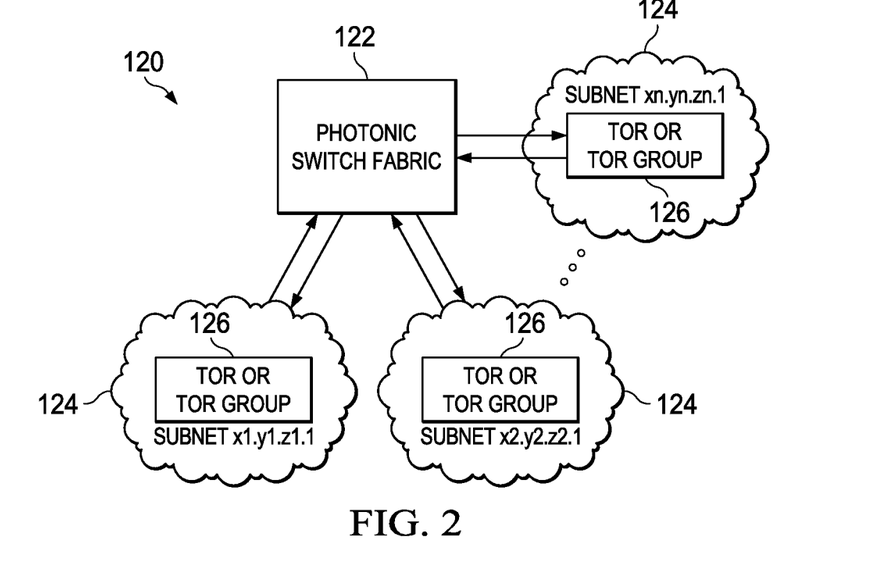
FIG. 2 illustrates an embodiment star architecture.

Another architecture that may be used for an optically bufferless packet switch is system 120 illustrated in FIG. 2. Photonic switching fabric 122 connects TORs or TOR groups 126 in a star configuration. TORs or TOR groups 126 are connected to subnetworks 124. In an example, a packet wrapping scheme with a fixed wrapper size is used. A TOR group to TOR group addressing strategy may be used, where a TOR group encodes the destination TOR group address into a label and transmits it to the photonic switching fabric over the signaling band. At the same time, data is sent via the data waveband.

Figure 3:
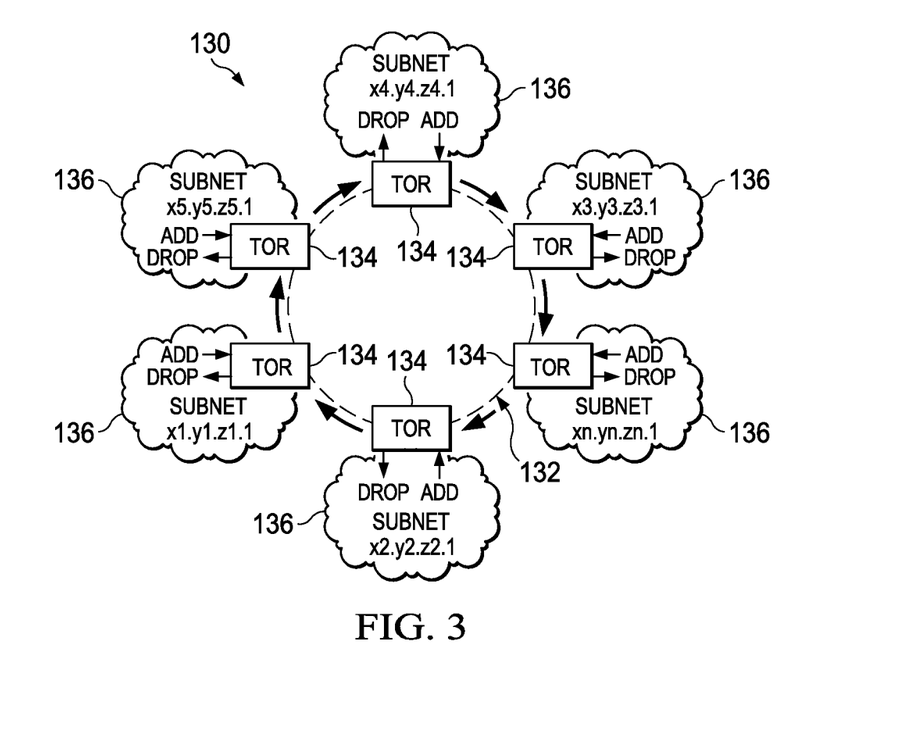
FIG. 3 illustrates an embodiment ring architecture.

In another example, illustrated by system 130 in FIG. 3, a ring architecture is used. TOR switches 134 are connected to each other in a ring by high capacity photonic ring 132. Also, TOR switches 134 are connected to subnetworks 136. In one example, high capacity photonic ring 132 has a bandwidth of 1.28 Tbps. The signaling waveband carries both routing and management information. Because the number of nodes in a ring is limited, a limited number of wavelengths may be used for addressing the TOR switches. For example, out of 12 wavelengths in the 1550 nm range, some may be used to address ring nodes and some are used for management and control. The signaling waveband may also carry other control signals, such as congestion status, fairness, and management.

Figure 4:
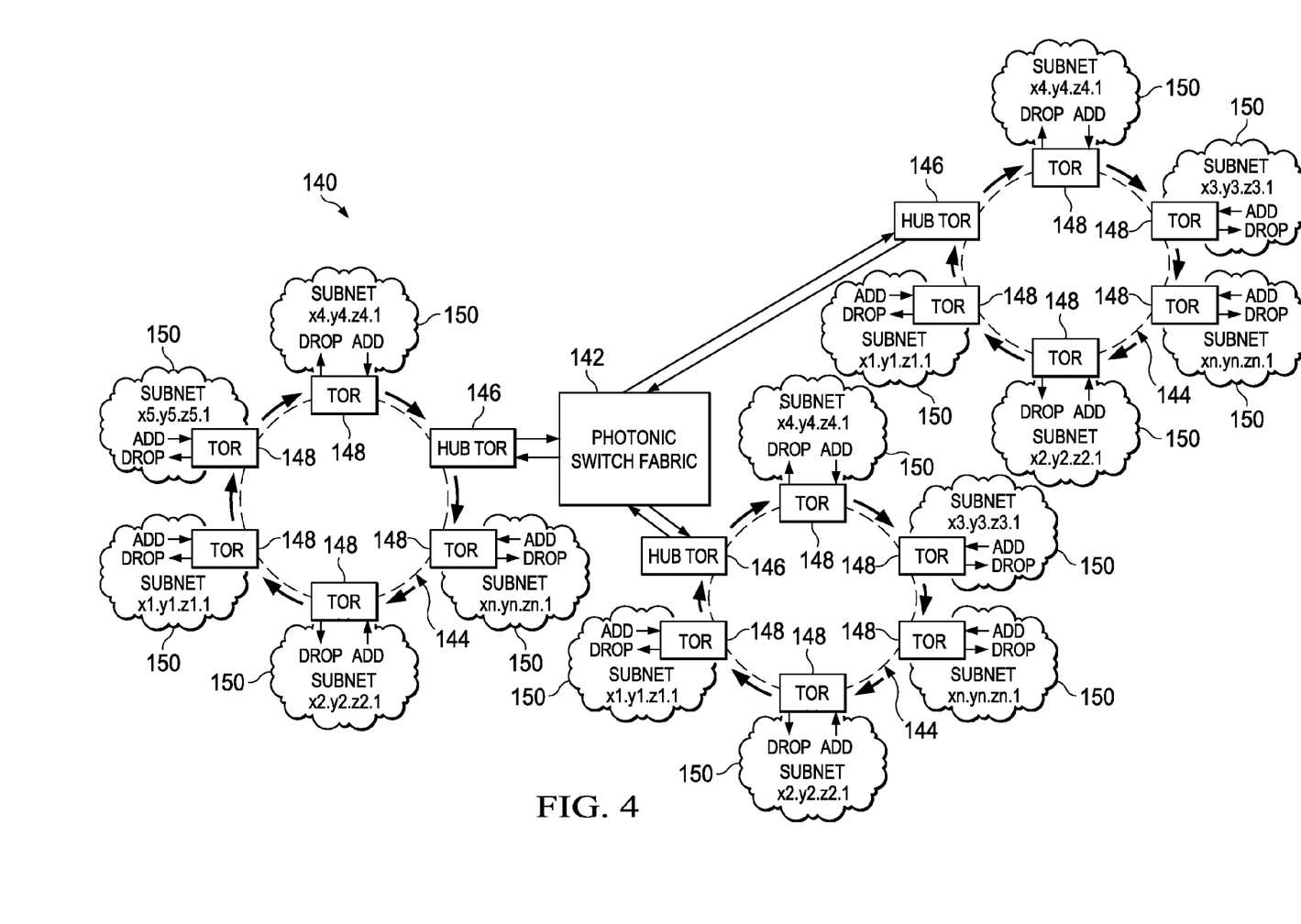
FIG. 4 illustrates an embodiment hybrid star-ring architecture.

FIG. 4 illustrates a hybrid star-ring architecture with system 140. TOR switch rings are interconnected with the photonic switching fabric. Photonic switching fabric 142 is coupled to TOR switches 146, hub TOR switches. Hub TOR switches are connected to TOR switches 148 with high capacity photonic rings 144. TOR switches 148 are then connected to subnetworks 150.

Figure 5:
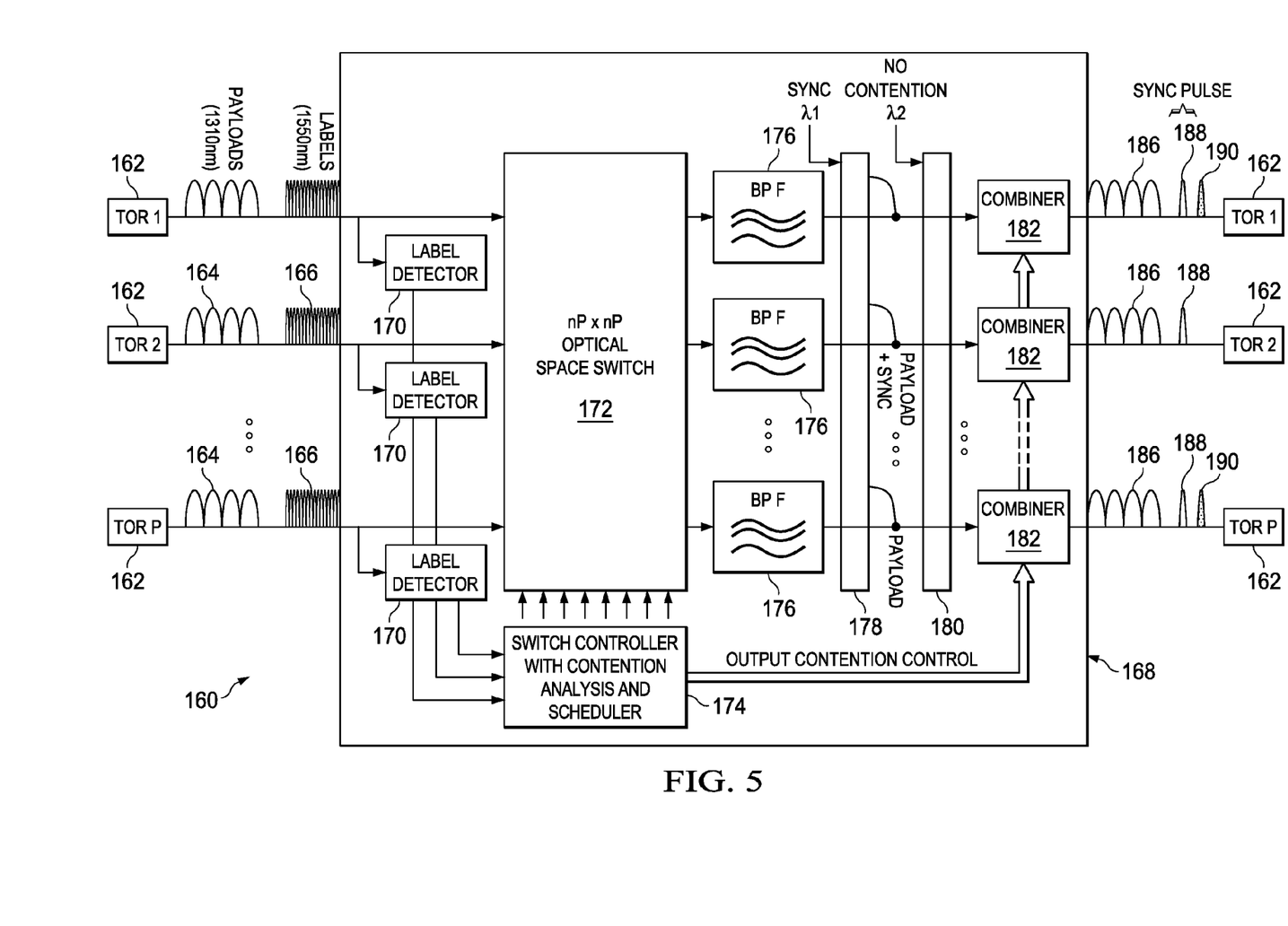
FIG. 5 illustrates an embodiment photonic switching fabric.

FIG. 5 illustrates photonic switching fabric 160, a bufferless photonic switching architecture. There is a separation of the signaling or control waveband 166 and data or payload waveband 164. For example, the 1310 nm wavelength band is used for the payload data and the 1550 nm wavelength band is used for the control signaling.

A silicon photonic transceiver in the 1550 nm waveband may be used to generate and receive the control signals. Low cost Fabrey-Perot lasers may be used as the light source for high speed wavelength division multiplexing (WDM). There may be a pair of integrated transceivers per segment or hop of the network in the TOR groups. The signaling path carries point-to-point information between two points or nodes. At TOR switches 162, a destination address and payload data are encoded and modulated in two separate bands. The labels are modulated on a control wavelength and transmitted to photonic switching fabric 168, which may be integrated in a photonic integrated circuit (PIC). In an example, a laser array is flip-chip bonded onto a silicon photonic chip using an automated pick-and-place machine and passive alignment. Using physical features and alignment marks, the array is soldered in place, precisely aligning the lasers with their corresponding waveguides on the silicon photonic chip. There may be a grating on the waveguides of the silicon chip to convert a broadband laser into a precise WDM laser. The gratings are imprinted simultaneously using a photolithographic mask. The laser gratings are created using a silicon process, so the lasers can be used to generate the required wavelengths.

In photonic switching fabric 168, the label information is decoded by label detectors 170. For example, label detectors 170 may be integrated wavelength division multiplexing (WDM) detectors. The label signals are separated by wavelength. Then, the power of each separated wavelength signal is detected, by the optical signal being converted to an electrical signal. In one example, the power of the separated wavelength signals are converted to a digital binary signal, where a 1 is produced if the power is above a threshold and a 0 is produced when the signal is below the threshold, or vice versa. The digital signal may then indicate the destination address of the corresponding pattern.

The decoded label information is then passed to switch controller 174. In switch controller 174, contention analysis and scheduling are performed in the electrical domain. Switch controller 174 may be implemented in another layer of silicon that also includes silicon photonic switch, as a field programmable gate array (FPGA), or another dedicated hardware processor, such as an application specific integrated circuit (ASIC). In one example, a packet is either granted or dropped. Switch controller 174 adjusts the connections in optical switch 172, an nP by nP optical space switch to facilitate switching of the granted packets. The scheduling information on which payload slots are granted is also passed to combiners 182. More details on an example switch controller are provided by U.S. patent application Ser. No. 14/246,711 filed on Apr. 7, 2014, and entitled "System and Method for Photonic Switching," which application is hereby incorporated herein by reference.

The payload data is switched by optical switch 172. Optical switch 172 may be an optical space switch. An optical space switch is a photonic packet switch which couples an input to an output for the duration of an optical packet. In one example, optical switch 172 is a solid state photonic switch, for example made from silicon.

The switched payload data is optionally filtered by filters 176, which pass the payload wavelengths but filter out the control wavelengths. Filters 176 may be bandpass or low-pass filters. Filters 176 allow the payload wavelengths to pass through while filtering out the control wavelengths.

Then, synchronization information is added by block 178, which produces a pulse at $\lambda_1$, a wavelength in the control waveband. The synchronization pulse is modulated on $\lambda_1$ for the destination TORs at the same time. When there is no contention, another pulse is added by block 180. The contention pulse at $\lambda_2$, another wavelength in the control waveband, may be before, after, or simultaneous with the synchronization pulse. In one example, when a contention pulse is produced, it indicates that there is no contention, and the packet for the requested destination may be transmitted by the TOR switch. A lack of a contention pulse indicates output contention, and that the packet should not be transmitted by the source TOR switch. Alternatively, a contention pulse indicates a lack of contention, and no pulse indicates contention. Block 178 and block 180 are 1×N splitters. In one example, they are silicon photonics.

Combiners 182 then combine the payload data, synchronization pulses, and contention pulses. In one embodiment, combiner is an ON/OFF switch controlled by the contention pulse. When the combiner is ON, the waveguide carrying $\lambda_2$ wavelength is joined with the waveguide carrying the payload data. The contention controller determines which combiner will be ON. When there is no contention, a contention pulse is produced to signal the grant. This contention pulse facilitates $\lambda_2$ being combined with the payload and synchronization pulse inside the silicon photonic chip, also the signals are carried to the destination TOR switch.

Photonic switching fabric 168 outputs switched payload data 186, synchronization pulses 188, and contention pulses 190. These signals are received by TOR switches 162.

In one example, multiple cascaded switches are used.

Figure 6A:
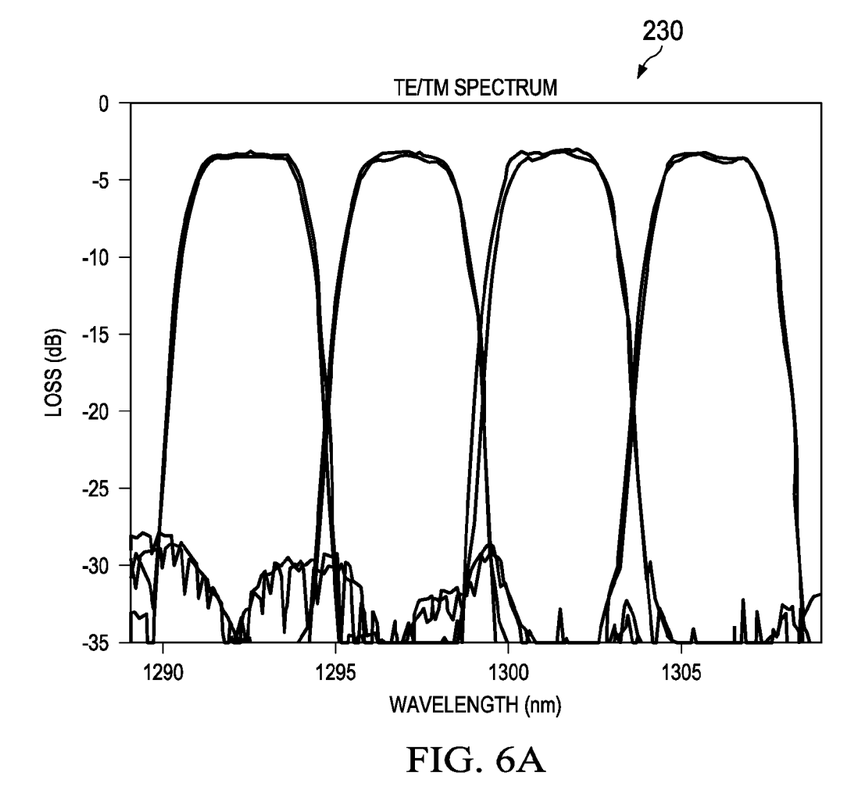
FIGS. 6A-B illustrate a photonic spectrum and an embodiment light source for a payload waveband.
Figure 6B:
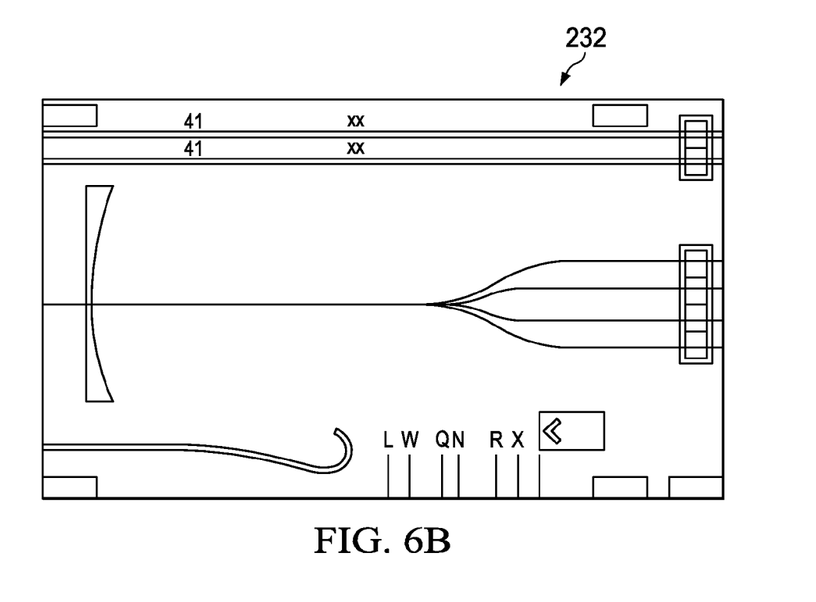

FIGS. 6A-B illustrate an example payload wavelength spectrum and light source. FIG. 6A illustrates spectrum 230 for payload data using low cost optics. One example of such low cost implementation uses four wavelengths s in the 1310 nm waveband, from 1290 nm to 1310 nm. Four 25 G WDM lasers may be used, for a total of 100 GE. Alternatively four 100 G WDM lasers are used for a total of 400 GE, or sixteen 25 G WDM lasers are used for a total of 200 G.

FIG. 6B illustrates demultiplexer source 232. Light source 242 has four wavelengths at 25 G each, for a total of 100 G. In another example, four 10 G light sources are used, for a total of 40 G. The multiplexer is located in the transmitting side, while the demultiplexer is located at the receiving side. Multiplexers and demultiplexers in the payload waveband are located at the source TOR switch and destination TOR switch, respectively.

Figure 7A:
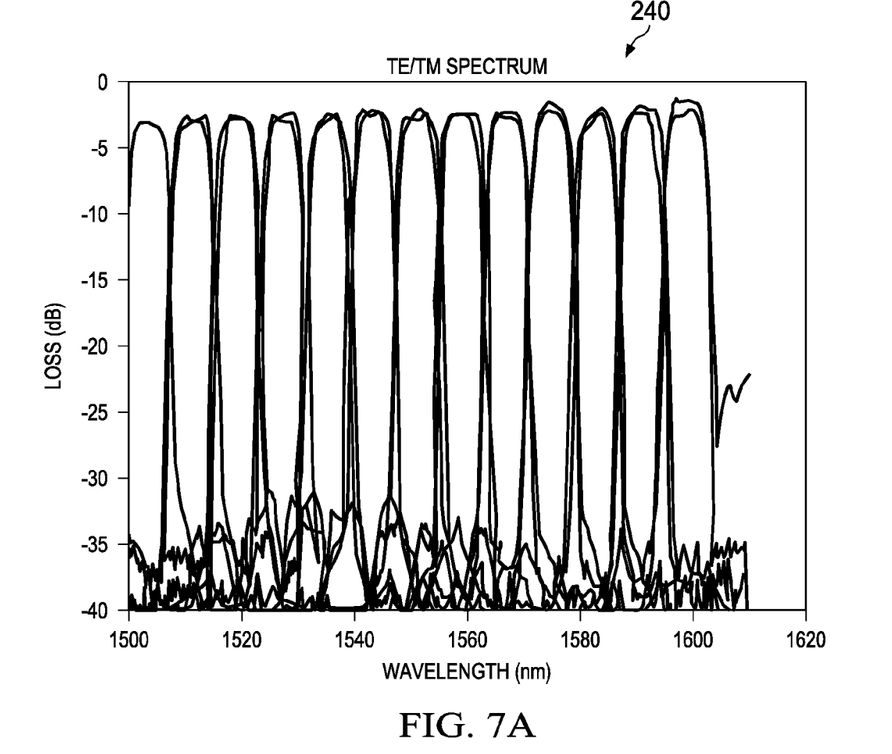
FIGS. 7A-B illustrate another photonic spectrum and another embodiment light source for a signaling and control waveband.
Figure 7B:
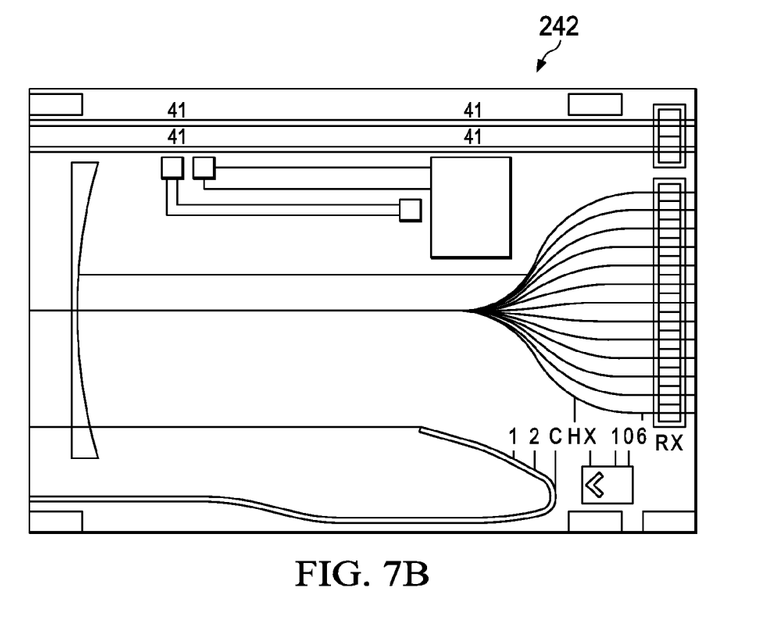

FIGS. 7A-B illustrate an example control spectrum wavelengths and light source. FIG. 7A illustrates spectrum 240 for the labels waveband. In this example there are twelve wavelengths in the 1550 nm waveband range, from 1490 nm to 1610 nm with a spacing of 8 nm for a low cost implementation.

FIG. 7B illustrates demultiplexing source 242. Light source 242 has 12 low rate, e.g., 1 G, light sources for the signaling and control signals. The multiplexing and demultiplexing of the control signals occur at the nodes. For example, for a single core switch, the multiplexer resides at the transmitting side and at the egress of the photonic switch. On the other hand, the demultiplexer resides at the ingress of the photonic switch and the receiving side. Both the multiplexers and demultiplexers at the photonic switch are integrated with the photonic switch in silicon.

Figure 8:
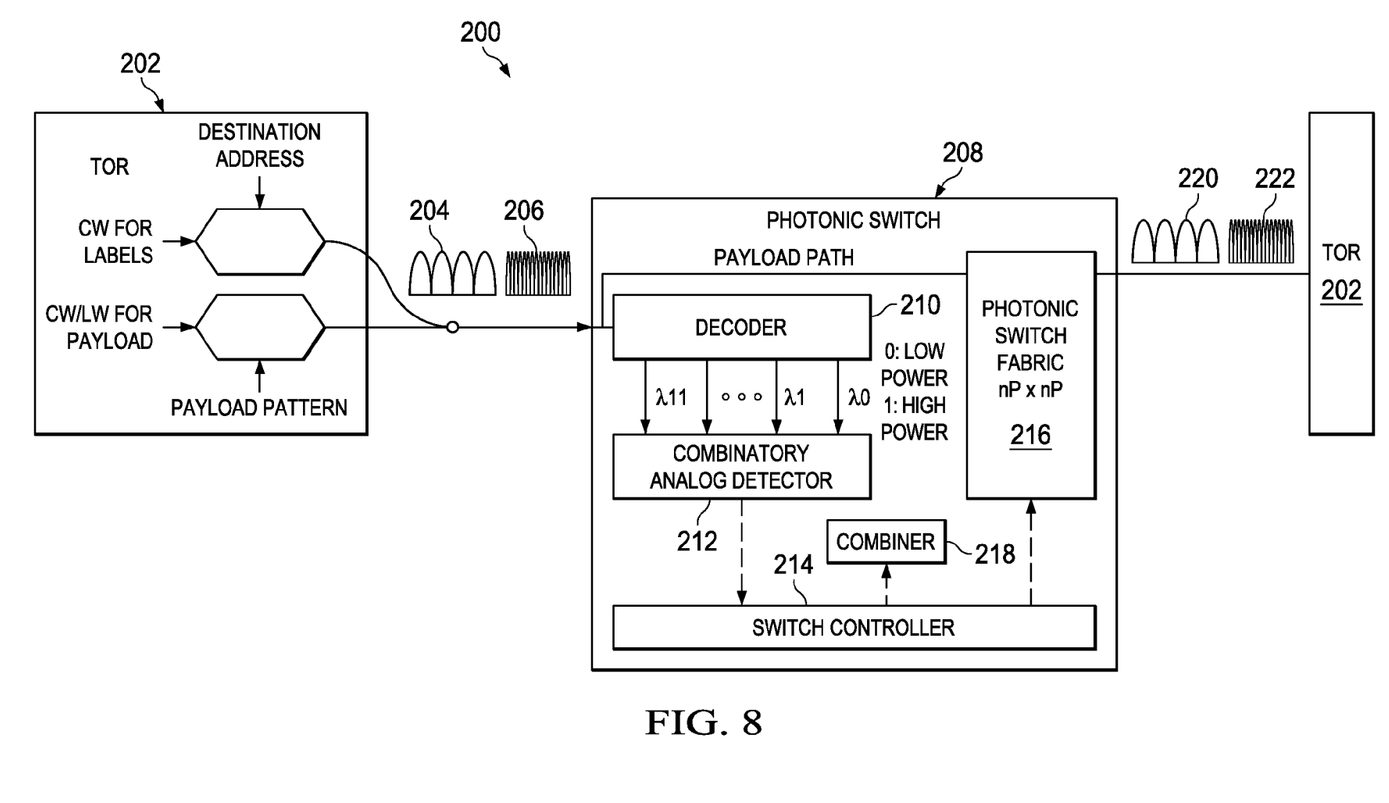
FIG. 8 illustrates an embodiment photonic packet switching system.

FIG. 8 illustrates photonic packet switching system 200, with photonic switch 208 with an integrated WDM multiplexer and demultiplexer for control and signaling. TOR switch 202 outputs the control waveforms with address labels and the payload data. In one example, multiple light sources produce the signaling wavelength in the carrier wavelength, which is modulated with the destination address, to produce labels 206 The signaling labels may be transmitted at a low rate, for example at 1 Gb/s, to save power. Similarly, multiple light sources produce the carrier wavelength, which is modulated with the payload pattern to produce payload data 204. The payload data is delayed by at least the round trip time plus the switch processing time, in order for the TOR switch to obtain approval to transmit the payload data. The labels are sent ahead of time as a request for an output destination and the payload is sent once it receives a grant.

The labels are transmitted to photonic switch 208. For example, photonic switch 208 is a silicon photonic switching fabric. The labels are decoded by wavelength division multiplexer (WDM) 210, a silicon photonic WDM, which may be integrated with photonic switch 208. WDM 210 may be a 12×10 G, 1 G, or lower. WDM 210 separates out the wavelengths in the control waveband.

Then, detector 212, a combinatory analog detector, determines the power levels of wavelengths to produce a digital electrical signal. Low power may be interpreted as a zero and high power as a one, or vice versa. The power level in the wavelength may represent bits of an address.

The output from detector 212 proceeds to switch controller 214. Switch controller 214 decides which connections to grant and which connections to reject when there is a conflict. For example, switch controller 214 decides to grant or reject packets. In one example, rejected packets are dropped. Alternatively, rejected packets are scheduled for a later timeslot.

Then, the modulated control signal 222 is sent to TOR switch 202. If TOR switch 202 receives a grant, it transmits the payload data associated with that grant. If TOR switch 202 does not receive a grant, it may resend the request. In one example, when a synchronous time slot based switching is used, TOR switch 202 receives a grant for a future timeslot. The payload data proceeds directly to photonic switching fabric 216, an nP by nP photonic space switch. Switch controller 214 determines which input is connected to which output of switching fabric 216. The payload data is then switched by photonic switching fabric 216 in this configuration. The switched payload data from photonic switching fabric 216 is combined with the determination of switch controller 214 in combiner 218. Finally, the modulated switched payload data 220 is sent to TOR switch 202, the destination TOR switch.

The demultiplexing function at the switch ingress and the multiplexing function at the switch egress are integrated with the switching fabric in a silicon photonic integrated circuit. The waveband carrying data from a source TOR switch is determined at the destination TOR switch. The signaling waveband carries the destination address from a source TOR switch to a switch ingress, and carries the control, synchronization, and other management information from the switch egress to the destination TOR switch.

The multiplexing and demultiplexing functions for signaling are performed at every switch hop. The multiplexing and demultiplexing of data on data waveband is performed at source and destination TOR switches.

Figure 9:
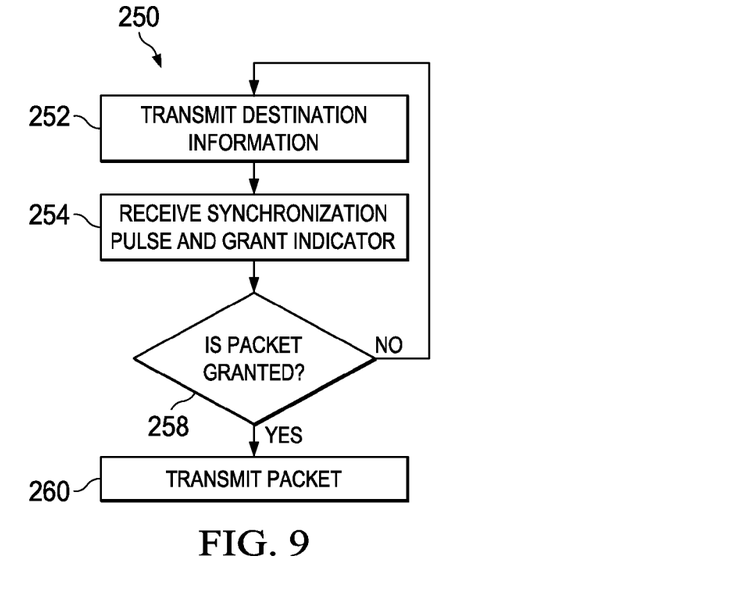
FIG. 9 illustrates a flowchart of an embodiment method of coordinating optical traffic by a top-of-rack (TOR) switch.

FIG. 9 illustrates flowchart 250 for a method of coordinating optical packets performed by a TOR switch. Initially, in step 252, the TOR switch transmits destination information for a packet. The destination address is modulated in a waveband, for example, in K wavelengths of a 1550 nm waveband. In one example, K=12 and the presence or absence of light at each of the K wavelengths in the waveband indicate bits in the destination address. In an example, twelve bit labels identify the destination port address of the switch. The twelve bits are encoded on twelve wavelengths. For example, twelve wavelengths between 1500 nm and 1600 nm with a spacing of 8 nm are used for a low cost implementation of signaling multiplexing and demultiplexing in the photonic switch fabric. The wavelengths have two power levels. Low power may represent a 0 and high power a 1, or vice versa. Twelve wavelengths address 4096 ports. In other examples, four, eight, sixteen, or another number of wavelengths are used. The ports may be connected to TOR group address domains or subnets. More details on wavelength encoding are discussed in U.S. patent application Ser. No. 13/902,085 filed on May 24, 2013, and entitled "System and Method for Multi-Wavelength Encoding," which application is hereby incorporated herein by reference.

In response to the address transmitted in step 252, the TOR receives a synchronization pulse and grant indicator from the photonic switching fabric in step 254. The grant indicates whether or not permission has been granted for the TOR switch to transmit the packet. In one example, a synchronization pulse followed by a grant pulse indicates that the packet has been granted permission for transmission, and a synchronization pulse not followed by a grant pulse indicates that the packet has not been granted permission for transmission.

Next, in step 258, the TOR switch determines whether permission to transmit the packet has been granted. In one example, a synchronization pulse followed by another pulse indicates that permission has been granted, while a synchronization pulse that is not followed by another pulse indicates that permission has not been granted. The synchronization pulse and the grant pulse may be at different wavelengths. Alternatively, the synchronization pulse and the grant pulse are at the same wavelength. The synchronization pulse and grant pulse may be in the control waveband. When permission to transmit the packet is not granted, the TOR switch proceeds to step 252 to repeat this process. When permission is granted, the TOR switch transmits the packet in step 260. The packet is modulated on a payload wavelength using an integrated WDM transceiver.

Figure 10:
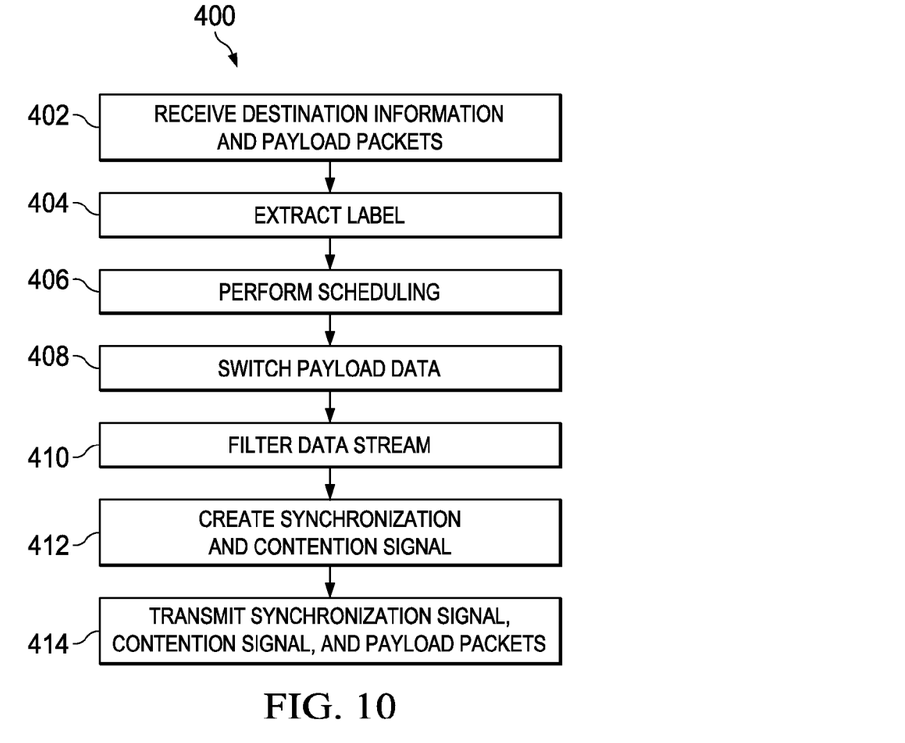
FIG. 10 illustrates a flowchart of an embodiment method of coordinating optical traffic by a photonic switching fabric.

FIG. 10 illustrates flowchart 400 for a method of coordinating packets performed by a photonic packet switching fabric. Initially, in step 402, destination information and payload packets are received. The destination information and payload packets may be in different wavebands. For example, the payload packets are in the 1310 nm waveband and the destination information is on the 1550 nm waveband.

Then, in step 404, the destination address for a future packet is extracted from the control waveband. For example, the destination address information is filtered by wavelength to separate out the wavelengths. Whether there is power at each wavelength is determined. In one example, the presence of optical power at a wavelength indicates a one bit and the absence of optical power indicates a zero bit. The bit pattern may be used to determine the destination address of a future packet.

Next, in step 406, scheduling is performed, so that, at a given time, each input port and output port is only used once. Some packets are approved for transmission, while other packets are rejected. In one example, rejected packets are dropped. Alternatively, rejected packets are scheduled for a later timeslot.

In step 408, the payload data is switched. This is done, for example, by an optical space switch, which maintains a connection for the duration of the packet. The connections in the optical space switch may be set based on the scheduled packets for the current timeslot. The optical space switch may be a solid state photonic switch.

In step 410, the switched payload data is optionally filtered to enable the payload data to be transmitted and the control wavelengths to be filtered out. For example, a bandpass filter or lowpass filter may be used.

Next, in step 412, synchronization and contention signals are created. A synchronization pulse may synchronize the TOR switches using a dedicated wavelength. The synchronization pulse may be followed by a contention pulse for a TOR switch which is granted permission to transmit a packet, and followed by nothing if the permission is not granted. The contention pulse and the synchronization pulse may be different wavelengths within the control waveband.

Finally, in step 414, the synchronization signal, contention signal, and switched payload packets are transmitted to a TOR. The switched payload signal is modulated on the payload waveband while the synchronization and control signals are modulated on the control waveband. The synchronization signal and contention signal may be transmitted on the same waveband as the labels.

Figure 11:
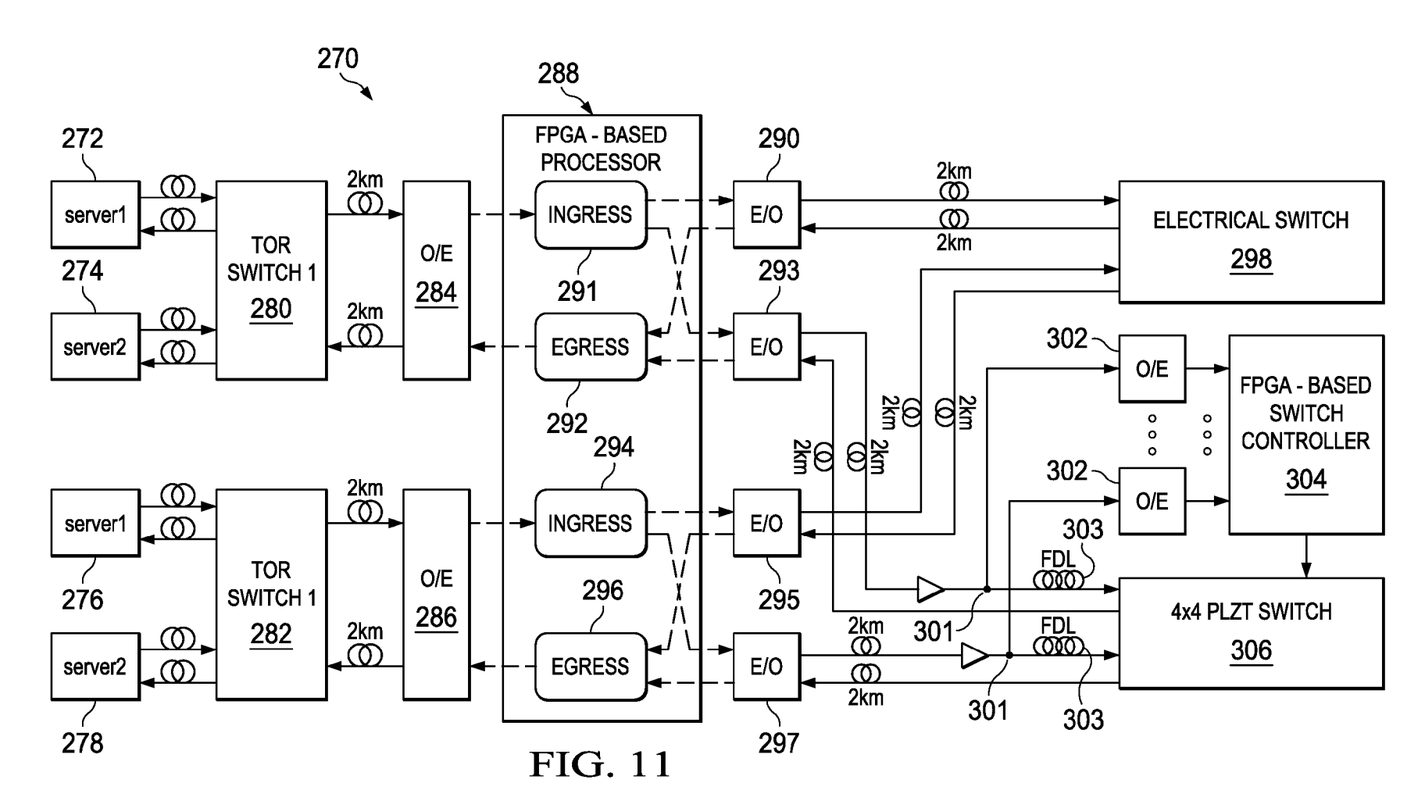
FIG. 11 illustrates an embodiment system for hybrid photonic packet switching.

FIG. 11 illustrates system 270, an embodiment system with electrical switch 298 and photonic switch 306, where short packets are switched by electrical switch 298 and long packets are switched by photonic switch 306. Additional details on a packet switching system where short packets are switched by an electrical switch and fast packets are switched by a photonic switch are discussed in U.S. patent application Ser. No. 13/902,008 filed on May 24, 2013, and entitled "System and Method for Steering Packet Streams," which application is hereby incorporated herein by reference.

Servers 272 and 274 are coupled to TOR switch 280, while servers 276 and 278 are coupled to TOR switch 282. The optical signals for TOR switch 280 and TOR switch 282 are converted to the electrical domain by optical-to-electrical converters 284 and 286, respectively.

Processor 288, a field-programmable gate array (FPGA) that may be part of TOR switches 280 and 282, processes the packets. Incoming packets are processed by ingress 291 and ingress 294, while outgoing packets are processed by egress 292 and egress 296. The links between TOR switches 280 and 282 and processor 288 are 10 Gigabit Ethernet. In ingress 291 and ingress 294, the long packets are separated from the short packets. Long packets are prepared for photonic switching by resolving packet contention. Contending long packets are handled by contention control in 288. After the contention is resolved, the packets are compressed, bitwise scrambled, and a photonic destination label is added. A label is followed by a scrambled media access control (MAC) frame. By compressing the long packets, there is sufficient inter-packet gap for the insertion of the photonic label, and there is more time for the photonic switch connection set-up and for receiver synchronization at the destination aggregation switch. The packet compression is achieved by raising the clock rate on the output physical layer. The long packets are 10% overclocked at 11.35 Gb/s. The label is a short pattern at 11.35 Gb/s. Additional details on the packet compression are provided by U.S. patent application Ser. No. 13/901,944 filed on May 24, 2013, and entitled "System and Method for Accelerating and Decelerating Packets," which application is hereby incorporated herein by reference.

In egress 292 and egress 296, the reverse operation is performed. The photonic long packets and the electronic short packets are received. The packets are re-ordered and forwarded as internet protocol (IP)/Ethernet packets towards the destination TOR switches.

The processed packets are then converted from the electrical domain to the optical domain by electrical-to-optical converters 290, 293, 295, and 297. Short packets are routed to electrical-to-optical converters 290 and 295 and proceed to be switched by electrical switch 298.

Long packets are routed to photonic switch 306, a 4×4 Lead-Lanthanum-Zirconate-Titanate (PLZT) photonic switch. The switching time of photonic switch 306 is about 10-20 ns. Fiber splitters 301 direct 10% of the power to optical-to-electrical converters 302. The electrical signals are used to control photonic switch 306 by switch controller 304, an FPGA based switch controller. Fiber delay lines 303 delay the signal long enough for the switch controller to read the photonic label and set the switch connection before the packet arrives.

Figure 12A:
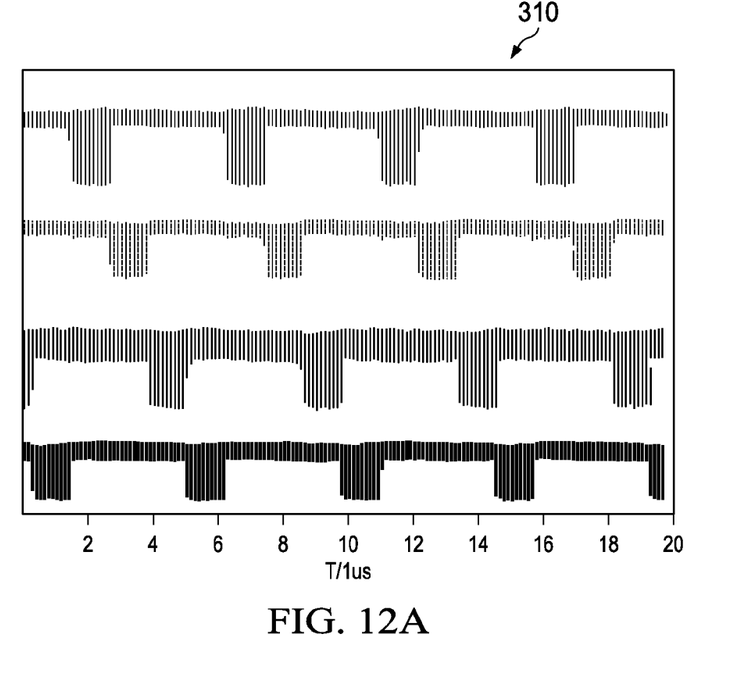
FIGS. 12A-C illustrate waveforms and an eye diagram for a photonic packet switching system.
Figure 12B:
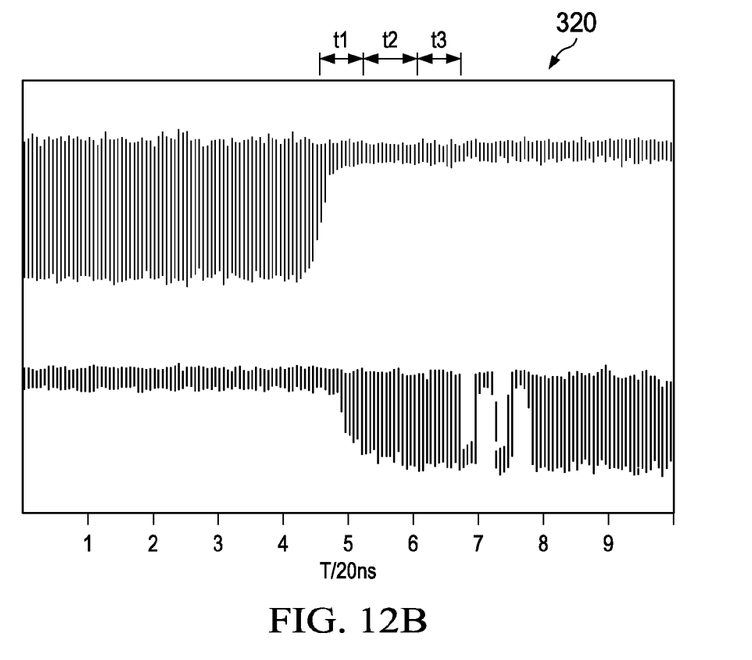
Figure 12C:
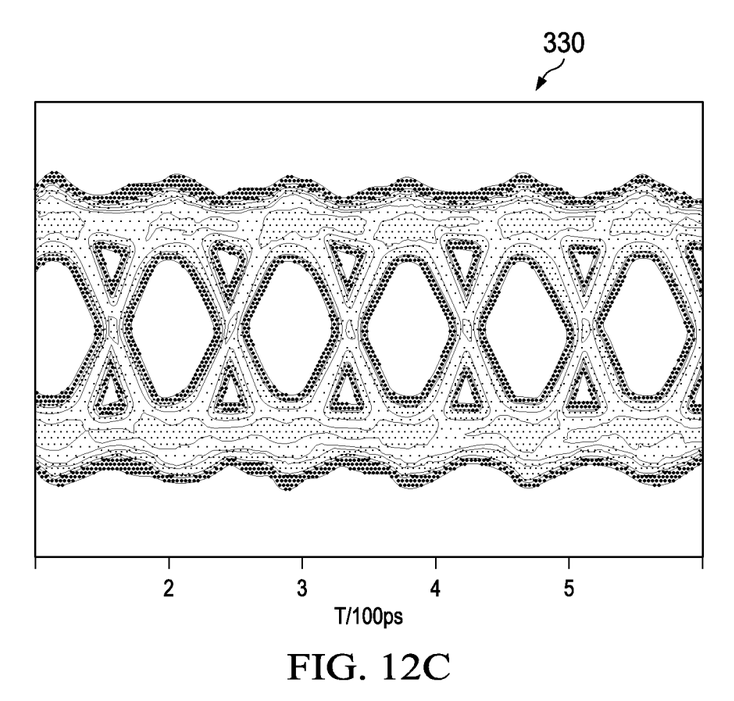

FIGS. 12A-C illustrate results from system 270 in FIG. 11. Server 272 sends Ethernet packets with four different destination MAC addresses, each destined to a different photonic output port of photonic switch 306. FIG. 12A illustrates graph 310 with the packet waveform on the four output ports of photonic switch 306. The photo-receiver voltage polarity is inverted, with horizontal lines when there is no light and the waveforms when there are switched packets.

FIG. 12B illustrates graph 320 with a detailed output packet waveform of output ports 1 and 2 of photonic switch 306. Output 1 completes a photonic frame transmission, and output 2 starts sending a preamble and photonic label. Switch response time is 12 ns, residual preamble for receiver synchronization is 15 ns, and start frame delimiter (SFD) time is 12 ns.

FIG. 12C illustrates graph 330 with an eye diagram of the switched signal. Because the total processing time is 130 ns, the latency for control processing is approximately 130 ns minus the switch response time minus the residual preamble time, or 103 ns. This delay can be compensated for by a 21 m delay line.

Figure 13:
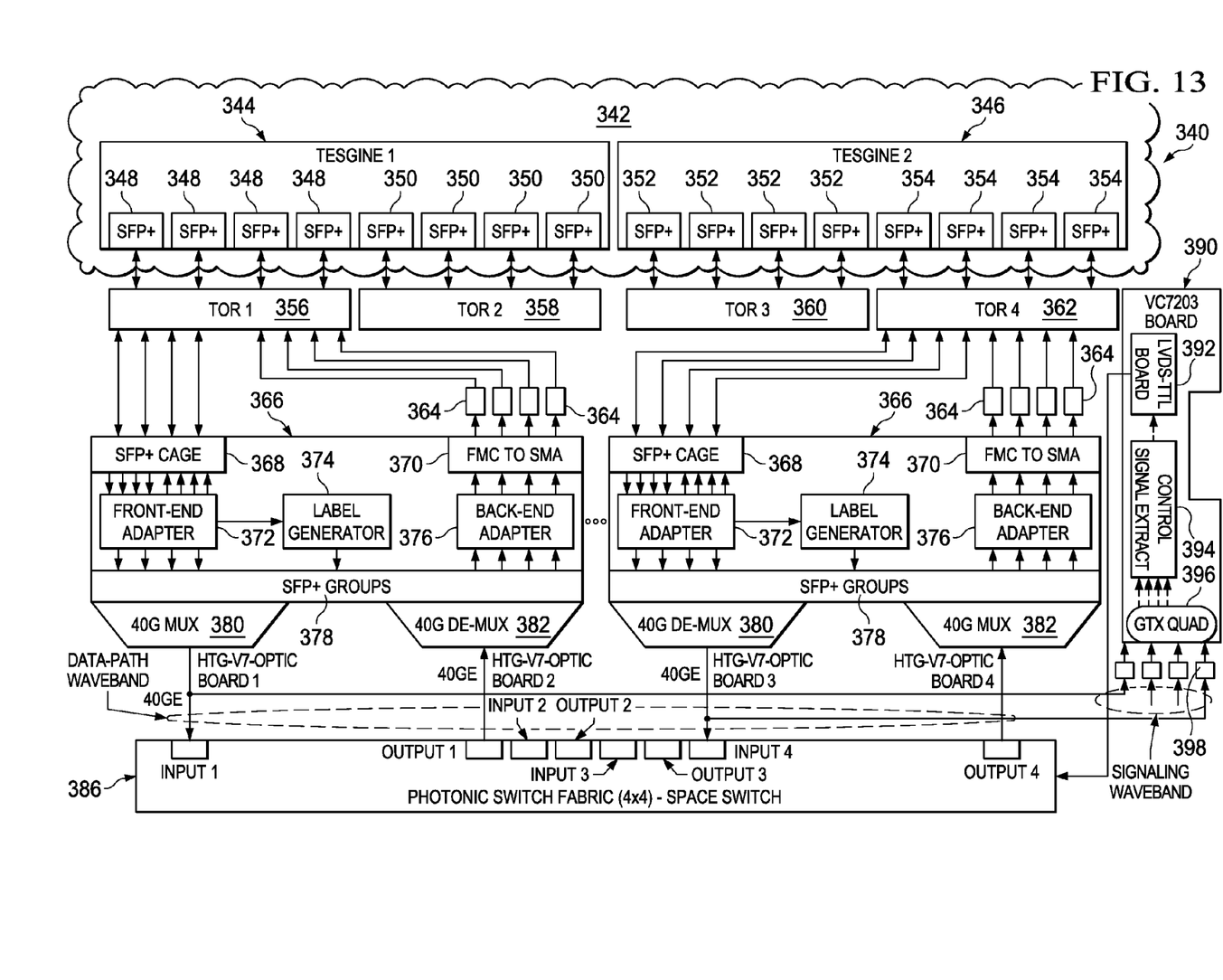
FIG. 13 illustrates another embodiment system for photonic packet switching.

FIG. 13 illustrates system 340, an embodiment photonic switching system that uses optical space switching. System 340 may be an implementation of a system 160 in FIG. 5. Separate wavebands are used for the control signal path and the payload data path. Photonic routing labels are used on the forward path. Signaling on the return path is used for contention control and synchronization.

Server network 342 is simulated by simulator 344 and simulator 346. Simulators 344 and 346 contain small form factor pluggable transceivers (SFPs) 348, 350, 352, and 354, which are connected to TOR switches 356, 358, 360, and 362. The signals are sent to FPGA 366.

In FPGA 366, signals are received by SFP 368. These signals are proceed by front-end adaptor 372. Labels are generated by label generator 374. The signals and groups are output by SFP 378 to photonic switching fabric 386 and FPGA 390.

The optical signal of the labels is converted to an electrical signal by optical-to-electrical converters 398, and is received by FPGA 390. They are processed by processor 396. Then, the control signal is extracted by control signal extractor 394. The control signals are then converted by low-voltage differential signal (LVDS) to transistor-transistor logic (TTL) board 392.

The data wave path signals and the signaling wave path signals are multiplexed by multiplexer 380, with data at 40 GE and signaling at 10 GE, and output to photonic switching fabric 386. The control signals from FPGA 390 are also input to photonic switching fabric 386. Photonic switching fabric 386 is a 4×4 optical space switch. The signals are switched, and output to FPGA 366.

The signals are received by demultiplexer 382 and SFP 378. They are processed by back-end adaptor 376. The signals are converted by FPGA mezzanine card (FMC) to subminiature version A (SMA) converter 370. The signals are converted to optical signals by electrical-to-optical converters 364, and proceed to TOR switches 356, 358, 360, and 362.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A photonic switching fabric comprising:
   a first label detector configured to read a first optical label to produce a first detected label, wherein the first optical label corresponds to a first optical packet, and wherein the first optical label is in a control waveband;
   a switch controller configured to adjust a photonic switch in accordance with the first detected label, and configured to generate a contention signal in accordance with the first detected label;
   the photonic switch, configured to switch the first optical packet, wherein the first optical packet is in a payload waveband; and
   a contention pulse unit coupled to the photonic switch, and configured to generate a contention pulse in accordance with the contention signal, wherein the contention pulse is in the control waveband.

2. The photonic switching fabric of claim 1, further comprising a synchronization light pulse unit coupled to the photonic switch, wherein the synchronization light pulse unit is configured to produce a synchronization light pulse, and wherein the synchronization light pulse is in the control waveband.

3. The photonic switching fabric of claim 2, further comprising a filter coupled between the photonic switch and the synchronization light pulse unit.

4. The photonic switching fabric of claim 1, wherein first label detector comprises a wavelength division multiplexer configured to produce a plurality of control optical signals.

5. The photonic switching fabric of claim 4, further comprising an optical energy detector configured to generate a plurality of electrical bits in accordance with the plurality of control optical signals.

6. The photonic switching fabric of claim 1, further comprising a second label detector configured to read a second optical label to produce a second detected label, wherein the second optical label corresponds to a second optical packet, wherein the second optical label is in the control waveband, wherein the second optical packet is in the payload waveband, wherein the switch controller is further configured to adjust the photonic switch in accordance with the second detected label, and wherein the photonic switch is further configured to switch the second optical packet.

7. The photonic switching fabric of claim 1, wherein the control waveband is a 1550 nm waveband and wherein the payload waveband is a 1310 nm waveband.

8. The photonic switching fabric of claim 1, wherein the payload waveband has four or more wavelengths.

9. The photonic switching fabric of claim 1, wherein the photonic switching fabric is configured to be coupled to a plurality of top-of-rack (TOR) switches.

10. The photonic switching fabric of claim 1, wherein the photonic switch is an optical space switch.

11. The photonic switching fabric of claim 1, wherein an integrated circuit comprises:
the photonic switch;
a multiplexer; and
a demultiplexer.

12. A method of photonic packet switching, the method comprising:
receiving, by an optically-bufferless photonic switching fabric from a first top-of-rack (TOR) switch, a first optical label corresponding to a first optical packet to be transmitted by the first TOR switch, wherein the first optical label is in a control waveband;
determining whether the first TOR switch has permission to transmit the first optical packet to produce a first contention signal in accordance with the first optical label;
transmitting, by the optically-bufferless photonic switching fabric to the first TOR switch, a first contention pulse in accordance with the first contention signal, wherein the first contention pulse is in the control waveband; and
receiving, by the optically-bufferless photonic switching fabric from the first TOR switch, the first optical packet when the first TOR switch has permission to transmit the first optical packet, wherein the first optical packet is in a payload waveband.

13. The method of claim 12, further comprising:
switching, by the optically-bufferless photonic switching fabric, the first optical packet in accordance with the first optical label to produce a switched optical packet; and
transmitting, by the optically-bufferless photonic switching fabric to a second TOR switch, the switched optical packet.

14. The method of claim 12, further comprising receiving, by the optically-bufferless photonic switching fabric from a second TOR switch, a second optical label corresponding to a second optical packet, wherein the second optical label is in the control waveband, wherein determining whether the first TOR switch has permission to transmit the first optical packet comprises determining whether the first optical packet conflicts with the second optical packet.

15. The method of claim 14, further comprising:
transmitting, by the optically-bufferless photonic switching fabric to the first TOR switch, a first synchronization pulse; and
transmitting, by the optically-bufferless photonic switching fabric to the second TOR switch, a second synchronization pulse.

16. The method of claim 14, further comprising:
determining whether the second TOR switch has permission to transmit the second optical packet to produce a second contention signal in accordance with the second optical label; and
transmitting, by the optically-bufferless photonic switching fabric to the second TOR switch, a second contention pulse in accordance with the second contention signal, wherein the second contention pulse is in the control waveband.

17. The method of claim 12, wherein the control waveband is a 1550 nm waveband and the payload waveband is a 1310 nm waveband.

18. The method of claim 12, wherein the control waveband is a 1310 nm waveband and the payload waveband is a 1550 nm waveband.

19. A method of coordinating photonic packets, the method comprising:
transmitting, by a top-of-rack (TOR) switch to an optically-bufferless photonic switching fabric, an optical label comprising an address of an optical packet, wherein the optical label is in a control waveband;
receiving, by the TOR switch from the optically-bufferless photonic switching fabric, a contention pulse generated in accordance with whether the TOR switch has permission to transmit the optical packet based on the optical label, wherein the first contention pulse is in the control waveband;
determining a transmission approval in accordance with the contention pulse; and
transmitting, by the TOR switch to the optically-bufferless photonic switching fabric, the optical packet in accordance with the transmission approval, wherein the optical packet is in a payload waveband.

20. The method of claim 19, further comprising receiving, by the TOR switch from the optically-bufferless photonic switching fabric, a synchronization pulse, wherein the synchronization pulse is in the control waveband.

* * * * *